(12) United States Patent
Schlipf et al.

(10) Patent No.: US 9,102,394 B2
(45) Date of Patent: Aug. 11, 2015

(54) FLOW BODY WITH A BASE BODY AND A LEADING EDGE

(75) Inventors: Bernhard Schlipf, Bremen (DE); Xavier Hue, Bremen (DE)

(73) Assignee: Airbus Operations GmbH (DE)

( * ) Notice: Subject to any disclaimer, the term of this patent is extended or adjusted under 35 U.S.C. 154(b) by 272 days.

(21) Appl. No.: 13/559,825

(22) Filed: Jul. 27, 2012

(65) Prior Publication Data

US 2013/0026295 A1    Jan. 31, 2013

Related U.S. Application Data

(60) Provisional application No. 61/512,588, filed on Jul. 28, 2011.

(30) Foreign Application Priority Data

Jul. 28, 2011  (DE) .......................... 10 2011 108 883

(51) Int. Cl.
*B64C 3/28* (2006.01)
*B64C 3/14* (2006.01)

(52) U.S. Cl.
CPC ............. *B64C 3/28* (2013.01); *B64C 2003/146* (2013.01)

(58) Field of Classification Search
CPC ............ B64C 1/12; Y02T 50/30; Y02T 50/43
USPC ................... 244/131, 132, 123.3, 119
See application file for complete search history.

(56) References Cited

U.S. PATENT DOCUMENTS

| | | | | |
|---|---|---|---|---|
| 1,886,708 A * | 11/1932 | Markey | .......................... | 244/132 |
| 2,473,728 A | 6/1949 | Rutledge | | |
| 7,992,822 B2 * | 8/2011 | Kato et al. | ..................... | 244/132 |
| 8,070,100 B2 * | 12/2011 | Douglas | ..................... | 244/123.1 |
| 2008/0164376 A1 | 7/2008 | Kato et al. | | |
| 2010/0065687 A1 * | 3/2010 | Douglas | ........................ | 244/130 |

FOREIGN PATENT DOCUMENTS

GB    162 918 A    5/1921

OTHER PUBLICATIONS

German Office Action dated Jun. 24, 2014.

* cited by examiner

*Primary Examiner* — Brian M O'Hara
*Assistant Examiner* — Keith L Dixon
(74) *Attorney, Agent, or Firm* — Lerner, David, Littenberg, Krumholz & Mentlik, LLP

(57) ABSTRACT

A flow body includes a flow body base body with a first shell element, a leading flow body edge with a second shell element and a clamping body, and a receiving space partially delimited by the clamping body. The flow body base body includes on a front end a projection, having a shape corresponding to that of the receiving space for engaging into the receiving space. The clamping body is internally arranged on the leading flow body edge spaced apart from a rear end of the second shell element. The rear end of the second shell element is flushly positioned on the first shell element when the projection engages into the receiving space. A smooth and harmonious transition that does not influence a laminar flow around the flow body can be achieved between the two components.

14 Claims, 7 Drawing Sheets

FLOW BODY WITH A BASE BODY AND A LEADING EDGE

CROSS-REFERENCE TO RELATED APPLICATIONS

The present application claims the benefit of the filing date of U.S. Provisional Patent Application No. 61/512,588 filed Jul. 28, 2011, the disclosure of which is hereby incorporated herein by reference.

TECHNICAL FIELD

The invention pertains to a flow body with a base body and a leading edge, as well as an aircraft with a flow body in the form of a wing.

BACKGROUND OF THE INVENTION

Wings of modern commercial aircraft and air freighters with a high take-off weight are subject to considerable requirements. On the one hand, the weight of the wing structure should be as low as possible, but the mechanical stability and elasticity should suffice for extreme flight maneuvers that are used as a design basis. A high reliability, as well as a particularly small number of individual parts, needs to be ensured in order to increase the safety of the aircraft and to improve the maintainability. In addition to stability and reliability aspects, the wing construction also needs to be as slender as possible in order to achieve the least possible drag, but still provide the greatest lift possible, wherein it is attempted to achieve a laminar flow, in particular, on the upper side of the wing.

A wing of a modern aircraft comprises at least one so-called wing box, in which several two-spar bending beams are arranged that are connected into a box-like element with the aid of ribs and by means of upper and lower shells that are reinforced with longitudinal reinforcing elements. This so-called wing box primarily serves for absorbing mechanical stresses during the flight. The upper and lower shell of the wing box are correspondingly shaped in order to achieve a desired aerodynamic behavior and supplemented with a rounded leading wing edge and a tapered trailing wing edge in order to form a complete profile with the least possible aerodynamic drag.

According to the prior art, there exists a variety of different connecting constructions for connecting leading wing edges to wing boxes. All these constructions comprise angle brackets, connecting bodies or similar elements that are connected to the wing box, as well as to the leading wing edge, by means of rivets or other connecting means. This results in, for example, a gap or a step being formed between an upper shell of the wing box and a skin panel of a leading wing edge, wherein this gap or step leads to a distortion of the laminar flow, in particular, at high flying speeds.

BRIEF SUMMARY OF THE INVENTION

An exemplary embodiment of the invention comprises a flow body with a base body and a leading edge that are connected to one another such that a reduction or elimination of all discontinuities is achieved in order to realize a laminar flow around the flow body. An advantage of the present invention can be seen in simplifying the installation of a flow body and in reducing the installation time.

According to an aspect of the invention, the flow body comprises a flow body base body with at least one first shell element and a leading flow body edge with at least one second shell element and at least one clamping body, as well as at least one receiving space that is partially delimited by at least one of the clamping bodies, wherein the flow body base body comprises on a front end at least one projection, the shape of which corresponds to that of the at least one receiving space such that the at least one projection can engage into the at least one receiving space, wherein the at least one clamping body is internally arranged on the leading flow body edge such that it is spaced apart from a rear end of the at least one second shell element, wherein the rear end of the at least one second shell element is flushly clamped on the at least one first shell element when the at least one projection engages into the at least one receiving space.

In the context of the invention, the flow body is considered to be an aerodynamically active body that may be realized, in particular, in the form of a wing of an aircraft. However, the invention is not limited to such wings, but rather generally defines an object that comprises a flow body base body and a leading flow body edge.

The flow body base body is considered to be the main component of the flow body that, for example, carries the mechanical loads and fulfills the required aerodynamic functions of the flow body with shell elements. The flow body base body comprises at least one first shell element that may consist, for example, of an upper shell or a lower shell, between which reinforcing elements or the like may extend. In this respect, it is not important whether it actually consists of an upper shell or a lower shell as long as the properties described below can be realized. The flow body base body comprises a receiving end, on which the leading flow body edge needs to be arranged and to which a projection is attached that allows a load introduction from and to the leading flow body edge.

The leading flow body edge comprises at least one second shell element that extends, for example, over a significant or the entire spatial extent of the leading flow body edge such that upper and lower shells do not necessarily have to be separated from one another. In fact, the second shell element may serve for realizing a continuous change in shape or direction of a surface from an upper shell to a lower shell. At least one clamping body that comprises a receiving space is arranged on the leading flow body edge, preferably on its inner side. The mounting of the clamping body on the leading flow body edge practically can be carried out in an arbitrary fashion and may be realized, in particular, by means of welding, bonding, laminating or other connecting methods in order to reduce the connecting means protruding into the flow. The second shell element preferably extends over the clamping body such that the receiving space is covered by an inner side of the second shell element.

The receiving space of the at least one clamping body is designed for enclosing the projection of the flow body base body in order to ideally produce a form-fitting connection therewith. The projection therefore is shaped such that it can be introduced into the receiving space in order to allow a force transfer from the leading flow body edge to the flow body base body and vice versa. In a connection between the leading flow body edge and the flow body base body, the second shell element flushly rests on the first shell element accommodating the projection due to the extent of the second shell element. This simultaneously allows a load transmission between the leading flow body edge and the flow body base body, wherein it is also possible to eliminate connecting means that extend through the shell elements and outward to the aerodynamically active surface, as well as to simultaneously reduce or entirely eliminate any type of gap or step due to the flush contact.

The term receiving space refers to a geometric shape that is suitable for receiving an object. For this purpose, the receiving space comprises walls that are open on at least one side in order to allow the insertion of the object. In the context of the invention, the object is a projection on the leading flow body edge such that the receiving space comprises an opening for the insertion of the leading flow body edge and has a depth that suffices for completely accommodating the projection.

In comparison with a conventionally manufactured flow body, the flow body therefore has the same aerodynamic qualities, but the number of components for connecting the leading flow body edge to the flow body base body is significantly reduced and the transition between the leading flow body edge and the flow body base body simultaneously is significantly improved with respect to aerodynamic aspects.

In an advantageous embodiment of the invention, the projection of the flow body base body is realized in the form of an angular deflection on the front end of the first shell element. This essentially means that a relatively small section of the first shell element is angled relative to the plane, in which the first shell element primarily extends. The angular deflection is characterized by a defined change of angle and the formation of a connecting link that can be introduced into a corresponding receiving space of the at least one clamping body. In this way, a force in the primary direction can be easily introduced into the first shell element.

In an advantageous embodiment of the invention, the leading flow body edge comprises several clamping bodies that are spaced apart from one another and extend in a common mounting plane. Consequently, the leading flow body edge can uniformly introduce a load into the flow body base body along a mounting plane by means of a plurality of individual clamping bodies such that no jamming or impermissible mechanical stress on the first shell element occurs depending on the number of clamping bodies used.

In a likewise advantageous embodiment of the invention, the at least one clamping body is interrupted several times. A receiving space extending along a mounting plane may be opened in regular or irregular intervals by means of one or more cutouts in order to reduce the overall weight of the clamping body and therefore the leading flow body edge while still realizing a uniform mounting of the leading flow body edge on the flow body base body.

In an advantageous embodiment of the invention, the clamping body is realized in the form of a fold, the inner surfaces of which partially delimit the at least one receiving space. The clamping body therefore is an angled, plane component with a mounting link and a retaining surface that extends from the mounting link and on which the receiving space lies. In this context, a fold is a bend, an angular deflection or a bevel that essentially extends around the holding surface by 180°. A free end formed by the fold and the holding surface ideally do not contact one another, but rather are arranged at a distance from one another. The distance between the free end of the fold and the holding surface needs to be dimensioned such that the projection of the flow body base body can be inserted therein.

In an advantageous embodiment of the invention, the at least one projection comprises at least one opening that is dimensioned such that the at least one clamping body is slidable onto the at least one projection through the at least one opening. In this way, the installation of the leading flow body edge on the flow body base body can be significantly simplified because the sliding on or the insertion of the projection into the receiving space of the at least one clamping body does not necessarily have to take place over the entire length of the projection or the leading flow body edge, respec- tively. If the projection comprises one or more openings that are positioned such that they correspond to one or more clamping bodies, their cutouts, clear openings or the like, the leading flow body edge can be placed on the projection with a slight lateral offset such that the clamping body or clamping bodies lie in the openings of the projection in order to subsequently realize the attachment of the clamping body on the projection by means of a movement in or parallel to the plane of the projection.

In an advantageous embodiment, the at least one projection has the shape of a ramp in at least one region that is directed toward the at least one opening, wherein this ramp shape simplifies the attachment of the at least one clamping body on the at least one projection. In this context, the term ramp shape refers to the projection extending in a sloping fashion toward the openings.

In an advantageous embodiment of the invention, the at least one receiving space is tapered from an insertion width to a clamping width. In this case, a lateral sliding on can initially be realized with a low force that successively increases as the sliding progresses, for example, until the projection is clamped in the receiving space or the receiving spaces of the clamping body or the clamping bodies. In this case, the attachment of the leading flow body edge to the projection is significantly simplified.

In an advantageous embodiment of the invention, the rear end of the at least one second shell element comprises a tapered overlap in order to tightly fit against the first shell element. In this way, a flush surface and a harmonious transition from the second shell element to the first shell element are realized when the first end of the second shell element rests on the first shell element.

In an advantageous embodiment of the invention, the at least one second shell element is subjected to tension in a region between the at least one clamping element and the rear end when the at least one projection engages into the at least one receiving space, wherein said tension flushly clamps the rear end on the at least one first shell element. When the leading flow body edge is not installed, the second shell element may have a more significant curvature than specified, wherein this curvature leads to a slight contact pressure and therefore an always harmonious design of the transition when the first end of the second shell element is flushly placed on the first shell element.

In an advantageous embodiment of the invention, the width of the at least one receiving space is dimensioned such that the at least one projection adjoins at least two opposing boundary surfaces of the receiving space in a form-fitting fashion when the at least one projection engages into the at least one receiving space. In this way, the leading flow body edge is held in the specified position in a particularly simple and reliable fashion.

In an advantageous embodiment of the invention, the width of the at least one receiving space is dimensioned such that a bar body is insertable between the at least one projection and a boundary surface of the receiving space when the at least one projection engages into the at least one receiving space. In this embodiment, it is not necessary to laterally slide on the leading flow body edge to the flow body base body, wherein this provides particular advantages, for example, with very large leading wing edges, a large number of clamping bodies and a possibly non-linear extent of the projection. The leading flow body edge can be moved into a final position on the projection such that the projection is positioned in the clamping bodies. The intermediate space that still exists in the at least one receiving space can be filled with the bar body. It is particularly advantageous if the projection comprises connecting means, on which the bar body is held. These connecting means consist, for example, of holes, openings, bores or the like, through which rivets, screws, clamps or other elements can extend.

An advantageous embodiment of the invention furthermore comprises a tolerance compensation bar, wherein the depth of the receiving space of the at least one clamping body is greater than the extent of the part of the projection engaging into the at least one receiving space by a tolerance distance and the tolerance compensation bar bridges the tolerance distance when the at least one projection engages into the at least one receiving space. The tolerance compensation bar is inserted between the projection of the leading flow body edge and the receiving space of the clamping body such that manufacturing tolerances in the manufacture of the flow body base body and the leading flow body edge are compensated. For this reason, the receiving space should be dimensioned larger than required for the actual mounting function, i.e., realized with a greater depth. The desired dimension can be adjusted by inserting different tolerance compensation bars.

In an advantageous embodiment of the invention, the leading flow body edge and the flow body base body are realized with a divided rib structure with a leading flow body edge rib and a flow body base body rib that respectively comprise depressions in a connecting region, wherein said depressions form the clamping body in the assembled state of the divided rib structure. For example, the flow body base body rib and the leading flow body edge rib may respectively comprise, for example, a depression in the form of step-shaped recess, wherein the recesses face one another and jointly form the receiving space for accommodating the leading flow body edge in the assembled state of the two-part rib structure. Such a construction is particularly suitable for use in an aircraft wing. A second shell element can be connected to the leading flow body edge and may extend significantly beyond the location of the receiving space. The advantageous and above-described characteristics such as, e.g., the mounting, may be combined with this embodiment. The leading flow body edge rib and the flow body base body rib may comprise webs that serve for mounting the leading flow body edge rib and the flow body base body rib or the shell elements with the leading flow body edge rib and the flow body base body rib. The connection may be realized by means of bonding, riveting, welding or the like. A possible parting line advantageously begins at a connecting surface of the second shell element, from which the part of the second shell element lying above the flow body base body extends. When defining the position and the angle of such a parting line, the ease of access to the connection of the leading flow body edge rib and the flow body base body rib may be taken into consideration.

Another aspect of the invention is presented by an aircraft that comprises a flow body of the above-described type in the form of a wing, wherein the flow body base body is realized in the form of a wing box and the leading flow body edge is realized in the form of a leading wing edge.

DETAILED DESCRIPTION

Figure 1:
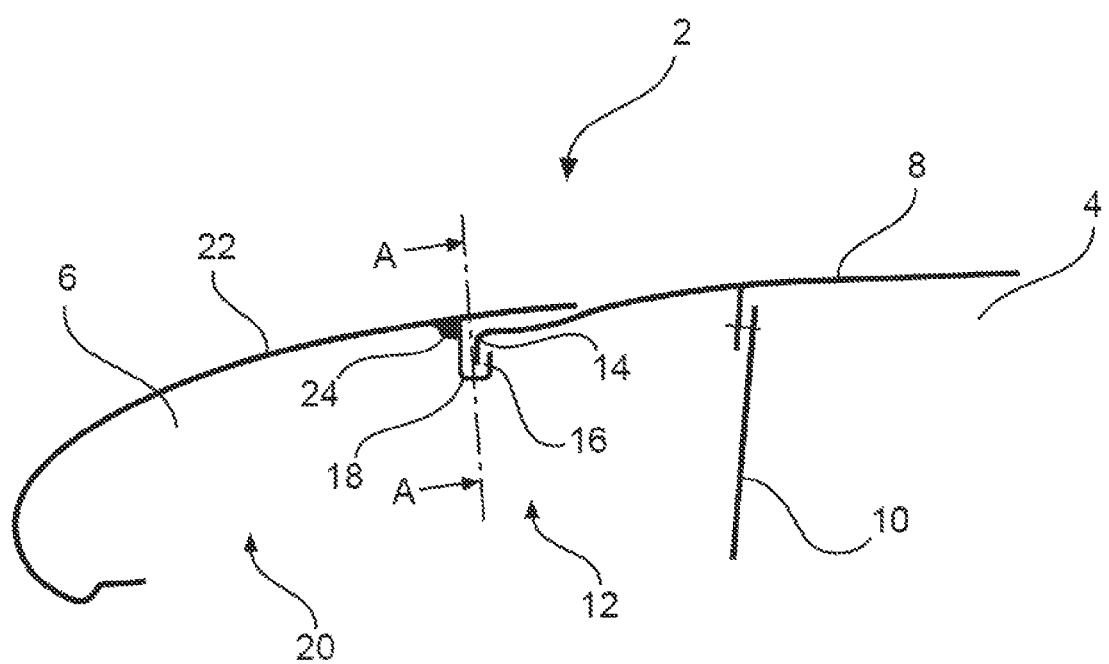
FIG. 1 shows a schematic representation of the flow body in the form of a simplified lateral section.

FIG. 1 shows a flow body 2 that comprises a flow body base body 4 and a leading flow body edge 6 in the form of a somewhat simplified representation. The flow body base body 4 comprises a first shell element 8 that forms a box-like object together with reinforcing components 10. On a receiving end 12, the first shell element 8 comprises a projection in the form of an angular deflection 14 with a shape that corresponds to that of a receiving space 16 of a clamping body 18. The clamping body 18 is arranged on a second shell element 22 on an inner side 20 of the leading flow body edge 6. It is particularly preferred to connect the clamping body 18 to the second shell element 22 by means of a welding seam 24 in order to limit the number of connecting means that extend outward. Alternatively, it would also be possible to choose bonded and laminated connections or different types of connections.

The peculiarity of the flow body 2 can be seen in that a very smooth and harmonious transition between the second shell element 22 and the first shell element 8 is realized in the receiving region 12 because practically no gaps or steps are created at this location and the laminarity of the flow around the flow body 2 is not impaired. Particularly significant advantages with respect to the aerodynamic performance are achieved, in particular, if the flow body 2 is used on an aircraft in the form of a wing with a flow body base body 4 that is realized in the form of a wing box and a leading flow body edge 6 that is realized in the form of a leading wing edge.

Figure 2A:
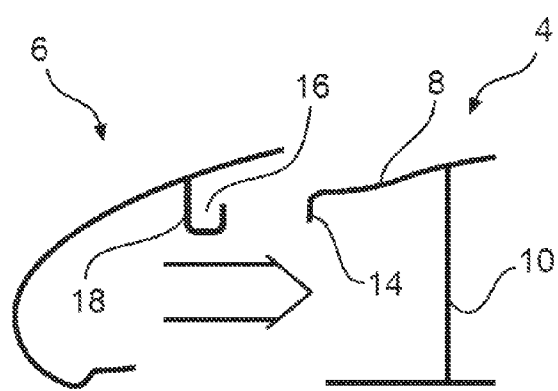
FIGS. 2a, 2b and 2c show the mounting of the leading flow body edge on the flow body base body according to a first embodiment in the form of a simplified lateral section (FIG. 2a), a simplified top view (FIG. 2b) and a simplified three-dimensional representation (FIG. 2c).
Figure 2B:
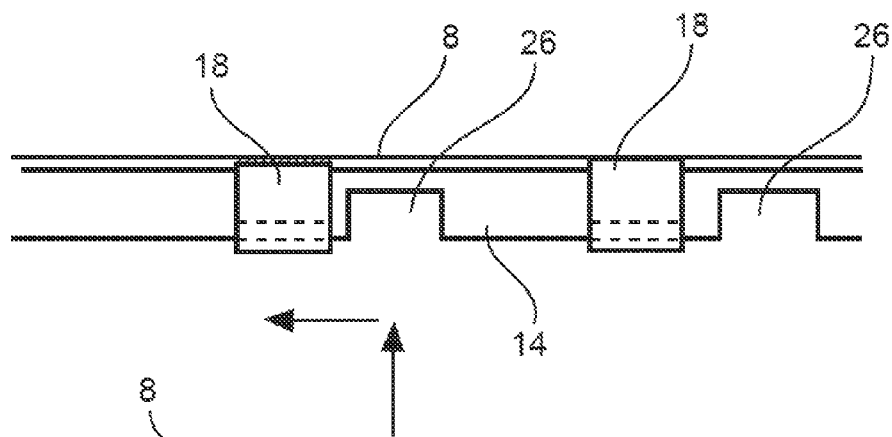
Figure 2C:
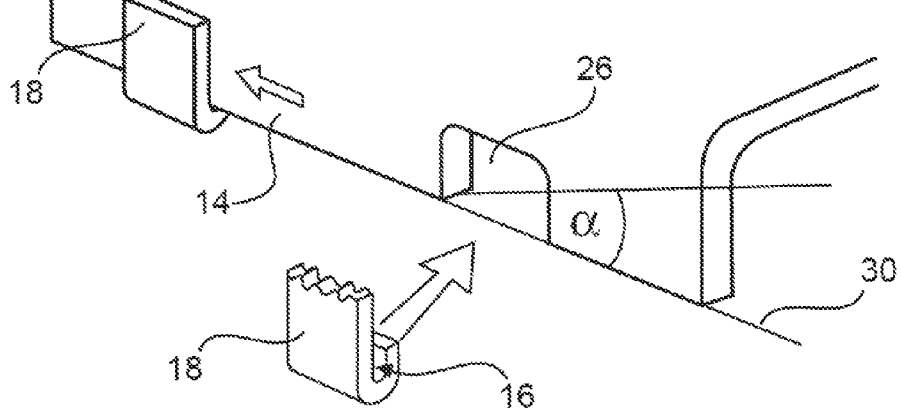

The leading flow body edge 6 is mounted on the flow body base body 4 as illustrated in FIGS. 2a to 2c that are described below. The leading flow body edge 6 is positioned relative to the flow body base body 4 in such a way that the receiving space 16 lies in a region of the angular deflection 14 of the flow body base body 4. According to FIG. 2b, the individual clamping bodies 18 can engage into openings 26 of the angular deflection 14 in order to be subsequently slid on the non-interrupted regions of the angular deflection 14. FIG. 2b shows the final position of two clamping bodies 18 that are arranged on the second shell element 22. The illustration in FIG. 2b only shows a section of the leading flow body edge 6 and the angular deflection 18 or the first shell element 8, respectively, but it goes without saying that further clamping bodies 18 may be provided.

FIG. 2c shows a three-dimensional representation of the angular deflection 14 and a cutout 26, into which a clamping body 18 can engage in order to be subsequently displaced toward the left in the plane of projection. In order to simplify the sliding on, the angular deflection 14 may be shaped like a ramp 28 in a region near the cutout 26, wherein this ramp is characterized by an edge angle α referred to the axis 30, along which the angular deflection 14 extends.

Figure 3:
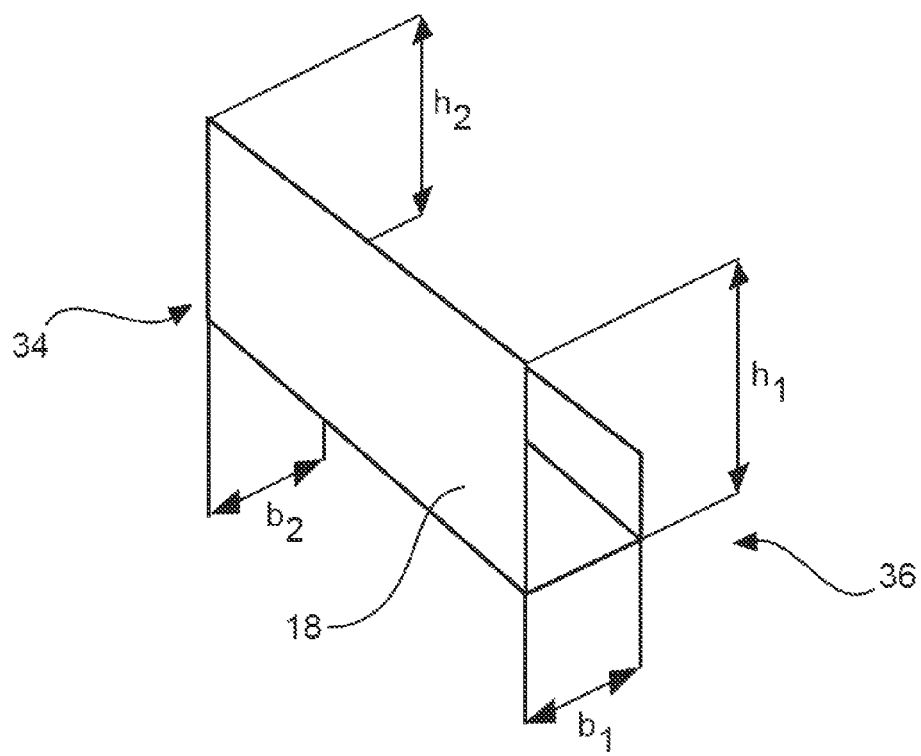
FIG. 3 shows a clamping body in the form of a simplified three-dimensional representation.

FIG. 3 shows an advantageous design of the clamping body 18 that further simplifies the attachment. In this case, the clamping body 18 is realized in the form of a sheet metal-like angle with a fold 32, the width of which is tapered from a width $b_2$ on an insertion end 34 to a width $b_1$ on a retaining end 36. For example, the height of the receiving space may also be reduced from a height $h_2$ on the insertion end 34 to a height $h_1$ on the retaining end 36.

Figure 4:
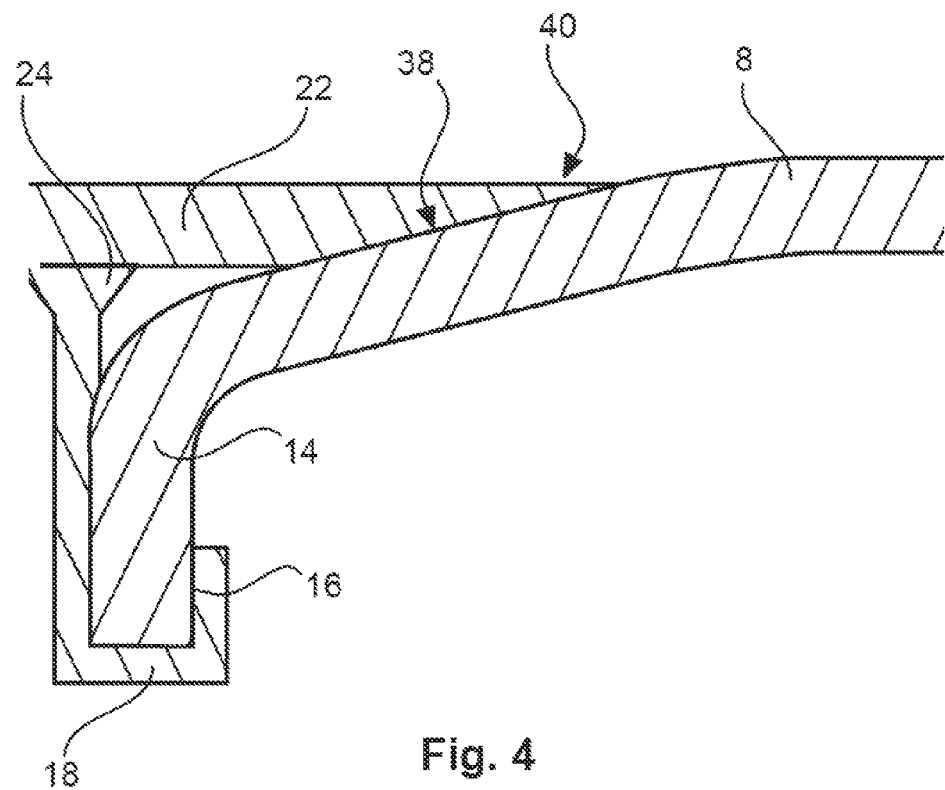
FIG. 4 shows a detail of a connection between the leading flow body edge and the flow body base body in the form of a simplified lateral section.

FIG. 4 shows a detail of an angular deflection 14 and a clamping body 18 for a first embodiment. According to this illustration, the first shell element 8 is shaped such that a lowered receiving surface 38 for receiving the second shell element 22 is provided. The second shell element 22 comprises a tapered overlap (mounting) or has a tapered thickness in order to realize the transition to the first shell element 8 as flush as possible. In order to further improve the durability of the harmonious transition, a rear end 40 of the second shell element 22 may be positioned such that the curvature of the second shell element 22 in the region between the end 40 and the position of the clamping body 18 is more significant in the non-mounted state than in the mounted state. In this way, a pre-tension is realized that continuously presses the second shell element 22 on the first shell element 8.

Figure 5:
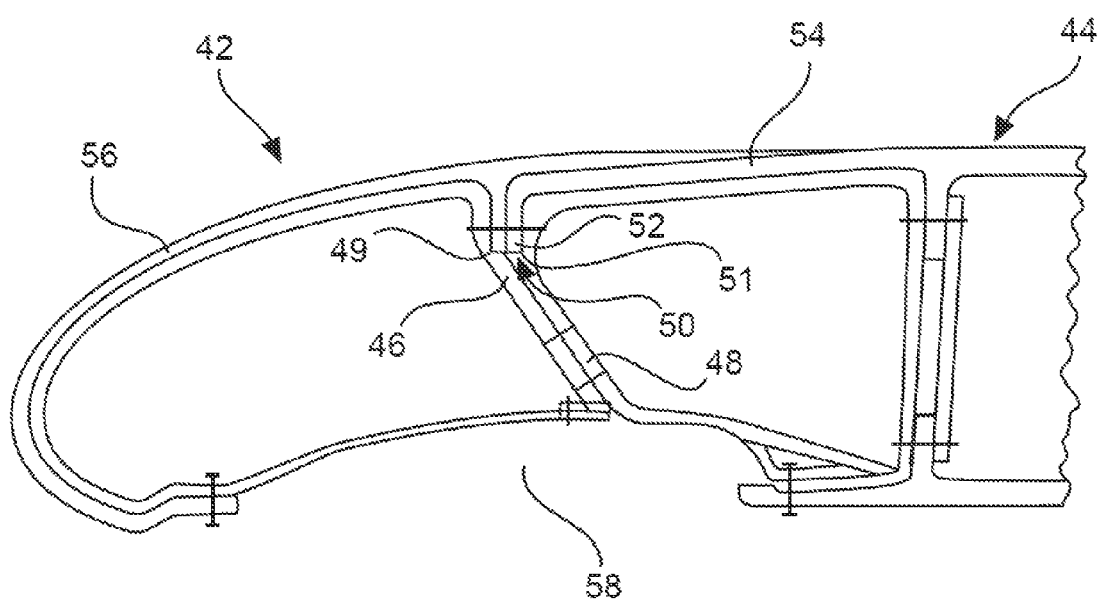
FIG. 5 shows a simplified lateral section through a leading wing edge and a wing box with a recess for a Krüger flap.

FIG. 5 shows a leading flow body edge 42 and a flow body base body 44 that are designed for use on an aircraft wing. In this case, the clamping body is realized in the form of a two-part rib structure with a leading flow body edge rib 46 and a flow body base body rib 48 that respectively comprise a depression 49, 51 such as, e.g., a respective step-like recess, wherein said depressions face one another and jointly form a receiving space 54 inserting an angular deflection 52 of the first shell element 54 in the assembled state of the two-part rib structure. A second shell element 56 is connected to the leading flow body edge rib 46, for example, by means of bonding or welding and extends significantly beyond the location of the receiving space 50, wherein this second shell element comprises a tapered overlap and forms a very harmonious transition to the first shell element 54. An internal riveting to rib bases or the like may also be purposeful. In the bonded variation, it is proposed to realize a riveting to the second shell element 56 on the underside. The front rib section is preferably preassembled with the second shell component 56. The rear flow body base body rib 28 on the wing side is preassembled with the first shell element 54 and may comprise internal riveted connections and/or bonded or welded connections. After assembling the leading flow body edge 42 and the flow body base body 44 and clamping together the two components, the leading flow body edge rib 46 and the flow body base body rib can be riveted to one another. Alternatively, it would also be conceivable to use a screw connection that may possibly be combined with shear pins.

A possible parting line advantageously begins at a connecting surface of the second shell element 56, from which the part of the second shell element 56 lying above the flow body base body 44 extends. When defining the position and the angle of such a parting line, the ease of access to the connection of the leading flow body edge rib 46 and the flow body base body rib 48 may be taken into consideration. Bottom chords of the leading flow body edge rib 46 and the flow body base body rib 48 can be advantageously connected by means of a connecting link or a doubler. Due to this architecture, the leading flow body edge 42 may be realized in the form of a preassembled subcomponent. Consequently, the observation of the tolerance with respect to the position of the kinematic load application points is also simplified.

A larger recess 58 illustrated on the underside of the leading flow body edge 42 and the flow body base body 44 serves for receiving a Krüger flap.

Figure 6A:
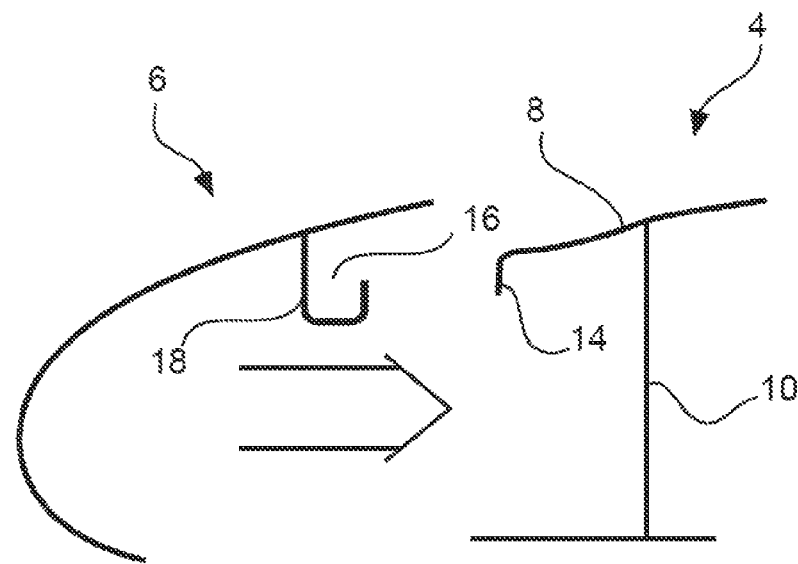
FIGS. 6a to 6c show the mounting of the leading flow body edge on the flow body base body according to a second embodiment in the form of a simplified lateral section (FIG. 6a), a simplified top view (FIG. 6b) and another simplified top view (FIG. 6c).
Figure 6B:
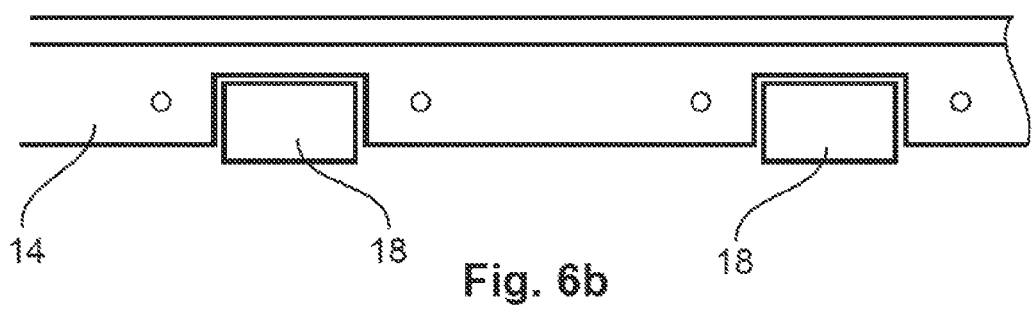
Figure 6C:
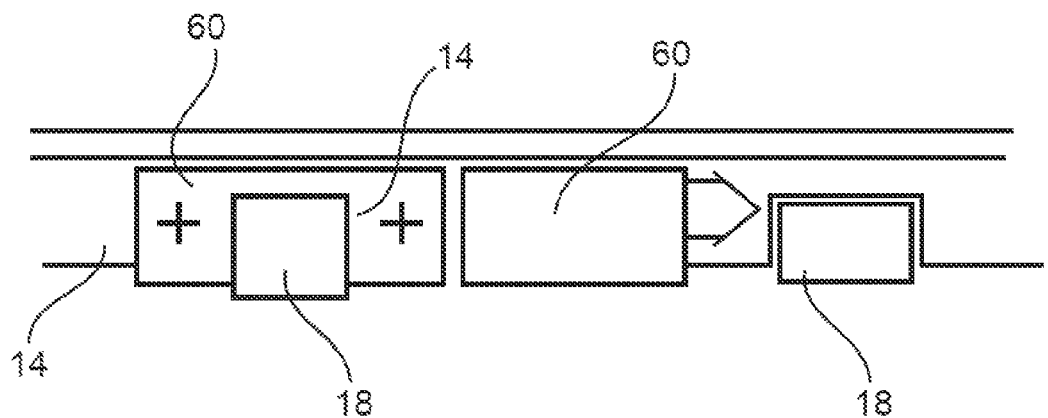

FIGS. 6a to 6c show a design that is modified in comparison with FIGS. 2a and 2b, wherein a leading flow body edge 6 with clamping bodies 18 is placed on an angular deflection 14 in order to be subsequently fixed by means of bar bodies 60 that are respectively introduced or inserted into the receiving spaces 16 of the clamping bodies 18.

Figure 7:
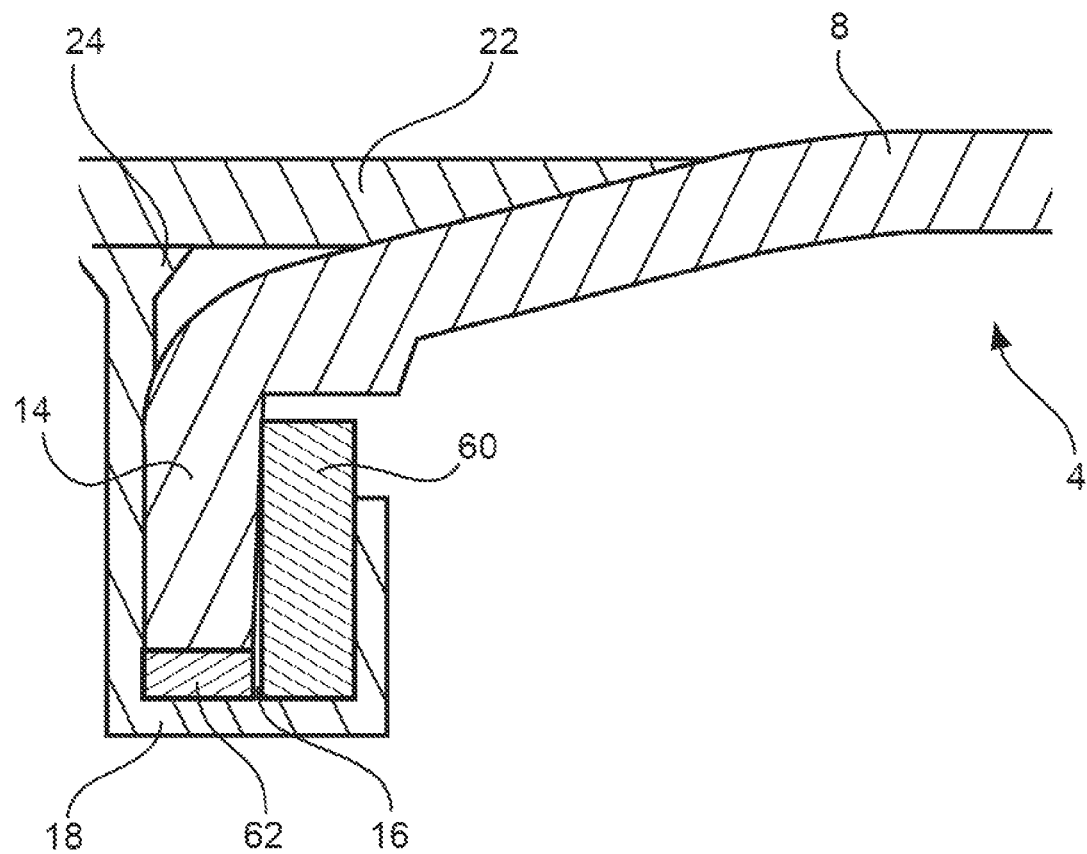
FIG. 7 shows a detail of the connection between clamping body and angular deflection according to the second embodiment.

FIG. 7 shows a somewhat more detailed illustration, in which the receiving space 16 of the clamping body 18 is dimensioned slightly larger than in the first exemplary embodiment such that the bar body 60 can also be introduced in addition to the angular deflection 14. In order to further compensate manufacturing tolerances, the receiving space 16 extends over a larger region than necessary, wherein the empty excess space is filled with a tolerance compensation bar 62.

Figure 8:
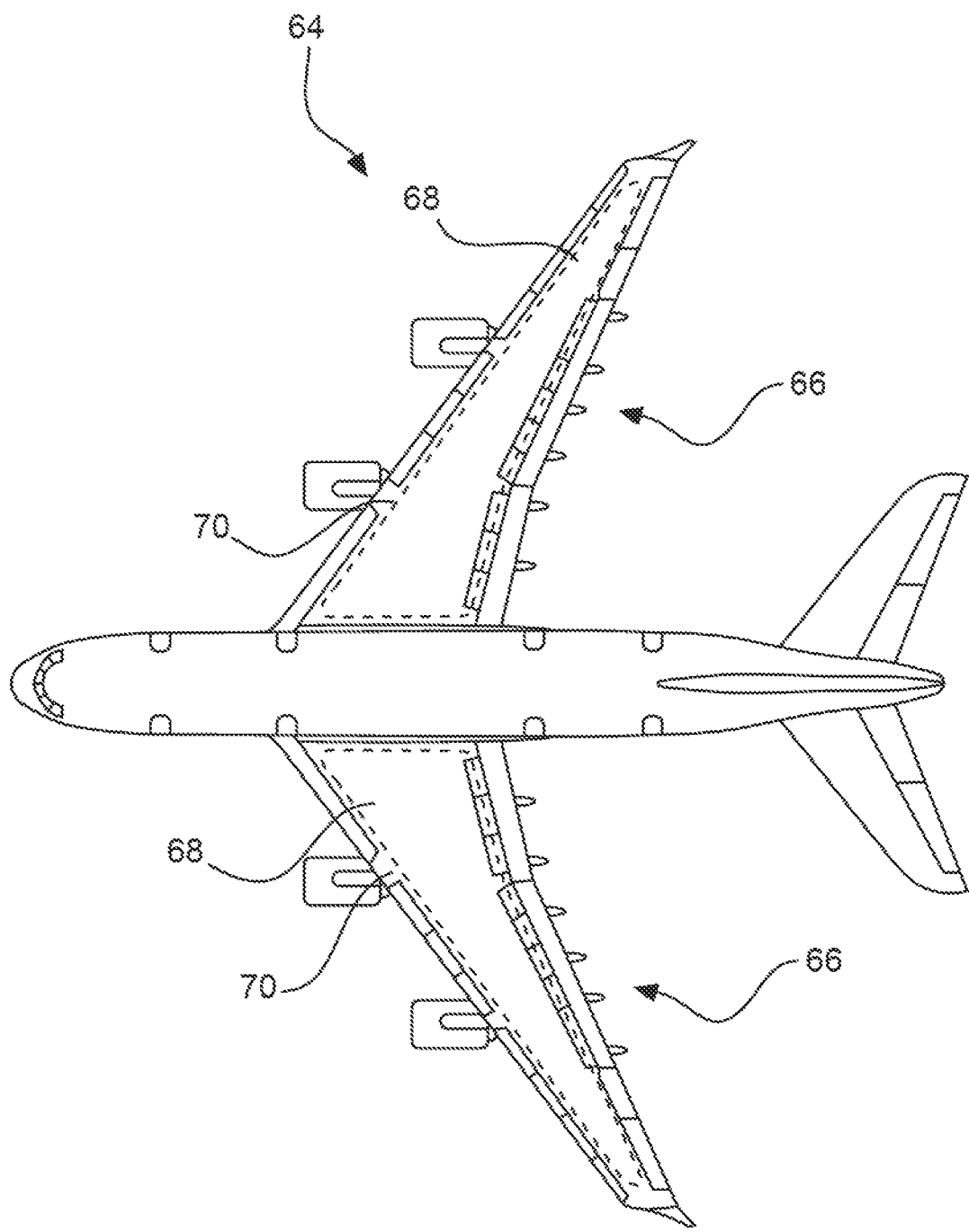
FIG. 8 shows an aircraft that is equipped with a flow body realized in the form of a wing.

FIG. 8 ultimately shows a highly schematic representation of an aircraft 64 with two wings 66 that respectively comprise a wing box 68 and a leading wing edge 70, wherein the wing box represents the flow body base body. Due to the advantageous inventive design of the connection between the wing boxes and the leading wing edges, the influence on the laminarity of the aerodynamic flow can be reduced such that the aerodynamic performance can be increased and the number of components required within the wings 66 for connecting leading flow body edges 70 is simultaneously reduced.

As a supplement, it should be noted that "comprising" does not exclude any other elements or steps, and that "a" or "an" does not exclude a plurality. It should furthermore be noted that characteristics described with reference to one of the above exemplary embodiments can also be used in combination with other characteristics of other above-described exemplary embodiments. Reference symbols in the claims should not be interpreted in a restrictive sense.

The invention claimed is:

1. A flow body, comprising:
   a flow body base body with at least one first shell element;
   a leading flow body edge with at least one second shell element and at least one clamping body; and
   at least one receiving space partially delimited by and defined by at least one wall of the at least one clamping body;
   wherein the flow body base body comprises on a front end at least one projection, the at least one projection is configured to establish a load-transmitting contact with the at least one wall of the at least one clamping body when received into the at least one receiving space,
   wherein the at least one clamping body is internally arranged on the leading flow body edge such that the at least one clamping body is spaced apart from a rear end of the at least one second shell element,
   wherein the rear end of the at least one second shell element is flushly clamped on the at least one first shell element when the at least one projection engages into the at least one receiving space with at least one wall of the at least one clamping body, and
   wherein the at least one projection comprises at least one opening dimensioned such that the at least one clamping body is slidable onto the at least one projection through the at least one opening.

2. The flow body of claim 1, wherein the projection comprises an angular deflection on the front end of the at least one first shell element.

3. The flow body of claim 1, wherein the leading flow body edge comprises a plurality of clamping bodies spaced apart from one another and extending in a common mounting plane.

4. The flow body of claim 1, wherein the at least one clamping body comprises a plurality of interruptions.

5. The flow body of claim 1, wherein the at least one clamping body comprises a fold; and
wherein the inner surfaces of the fold partially delimites the at least one receiving space.

6. The flow body of claim 1, wherein the at least one projection has the shape of a ramp in at least one region directed toward the at least one opening, and wherein the ramp shape facilitates the attachment of the at least one clamping body on the at least one projection.

7. The flow body of claim 1, wherein the at least one receiving space is tapered from an insertion width to a clamping width.

8. The flow body of claim 1, wherein the rear end of the at least one second shell element comprises a tapered overlap in order to tightly fit against the first shell element.

9. The flow body of claim 1, wherein the at least one second shell element is configured to be subjected to tension in a region between the at least one clamping element and the rear end when the at least one projection engages into the at least one receiving space, and wherein said tension flushly clamps the rear end on the at least one first shell element.

10. The flow body of claim 1, wherein the width of the at least one receiving space is dimensioned such that the at least one projection adjoins at least two opposing boundary surfaces of the receiving space in a form-fitting fashion when the at least one projection engages into the at least one receiving space.

11. The flow body of claim 1, wherein the width of the at least one receiving space is dimensioned such that a bar body is insertable between the at least one projection and a boundary surface of the receiving space when the at least one projection engages into the at least one receiving space.

12. The flow body of claim 1, further comprising a tolerance compensation bar, wherein the depth of the receiving space of the at least one clamping body is greater than the extent of the part of the projection engaging into the at least one receiving space by a tolerance distance and the tolerance compensation bar bridges the tolerance distance when the at least one projection engages into the at least one receiving space.

13. The flow body of claim 1, wherein the leading flow body edge and the flow body base body comprise a divided rib structure with a leading flow body edge rib and a flow body base body rib that respectively comprise depressions in a connecting region, and wherein said depressions form the clamping body in the assembled state of the divided rib structure.

14. An aircraft comprising a flow body, the flow body comprising a flow body base body with at least one first shell element;
a leading flow body edge with at least one second shell element and at least one clamping body; and
at least one receiving space partially delimited by and defined by at least one wall of the at least one clamping body;
wherein the flow body base body comprises on a front end at least one projection, the at least one projection is configured to establish a load-transmitting contact with the at least one wall of the at least one clamping body when received into the at least one receiving space,
wherein the at least one clamping body is internally arranged on the leading flow body edge so as to be spaced apart from a rear end of the at least one second shell element, and
wherein the rear end of the at least one second shell element is flushly clamped on the at least one first shell element when the at least one projection is received into the at least one receiving space and engages at least one wall of the at least one clamping body,
wherein the at least one projection comprises at least one opening dimensioned such that the at least one clamping body is slidable onto the at least one projection through the at least one opening,
wherein the flow body is configured as a wing of the aircraft,
wherein the flow body base body is configured as a wing box of the wing, and
wherein the leading flow body edge is configured as a leading wing edge of the wing.

* * * * *